United States Patent
Wang et al.

(10) Patent No.: US 9,606,390 B2
(45) Date of Patent: Mar. 28, 2017

(54) CAPACITIVE IN-CELL TOUCH PANEL AND DISPLAY DEVICE

(71) Applicant: Beijing BOE Optoelectronics Technology Co., Ltd., Beijing (CN)

(72) Inventors: Haisheng Wang, Beijing (CN); Cheng Li, Beijing (CN); Xue Dong, Beijing (CN); Xiaoliang Ding, Beijing (CN); Dong Chen, Beijing (CN); Chuncheng Che, Beijing (CN); Hailin Xue, Beijing (CN)

(73) Assignee: Beijing COE Optoelectronics Technology Co., Ltd., Beijing (CN)

( * ) Notice: Subject to any disclaimer, the term of this patent is extended or adjusted under 35 U.S.C. 154(b) by 174 days.

(21) Appl. No.: 13/968,030

(22) Filed: Aug. 15, 2013

(65) Prior Publication Data

US 2014/0055685 A1 Feb. 27, 2014

(30) Foreign Application Priority Data

Aug. 21, 2012 (CN) .......................... 2012 1 0299421

(51) Int. Cl.
*G02F 1/1335* (2006.01)
*G02F 1/1333* (2006.01)
(Continued)

(52) U.S. Cl.
CPC .......... *G02F 1/13338* (2013.01); *G06F 3/044* (2013.01); *G06F 3/0412* (2013.01)

(58) Field of Classification Search
CPC ..... G02F 1/13338; G06F 3/0412; G06F 3/044
(Continued)

(56) References Cited

U.S. PATENT DOCUMENTS

2008/0117182 A1* 5/2008 Um ...................... G06F 3/0412
345/173
2009/0225047 A1* 9/2009 Lee et al. ...................... 345/173
(Continued)

FOREIGN PATENT DOCUMENTS

| CN | 201477560 U | 5/2010 |
| CN | 202711227 U | 1/2013 |
| CN | 102436107 A | 5/2013 |

OTHER PUBLICATIONS

First Office Action (Chinese language) issued by the State Intellectual Property Office ("SIPO") on Dec. 3, 2014 for International Application No. 201210299421.X, 8 pages.
(Continued)

*Primary Examiner* — Charles Chang
(74) *Attorney, Agent, or Firm* — Sills Cummis & Gross P.C.

(57) ABSTRACT

Embodiments of the invention disclose a capacitive in-cell touch panel and a display device, in which at least a touch sense electrode (6) is disposed on a color film substrate (1), at least a touch drive electrode (5) is disposed on a TFT array substrate (2), the touch drive electrode (5) is electrically connected to a gate line (7) in the TFT array substrate (2), wherein each touch drive electrode (5) comprises a plurality of touch drive sub-electrode (51) arranged in the same row and disposed between adjacent columns of pixel units. The capacitive in-cell touch panel and the display device provided by the embodiments of the invention employ an input display signal of the gate line (7) electrically connected to the touch drive electrode (5) as the touch drive signal to realize the touch control function, thereby avoiding the addition of an IC for touch drive and reducing the production cost.

14 Claims, 8 Drawing Sheets

(51) Int. Cl.
*G06F 3/041* (2006.01)
*G06F 3/044* (2006.01)

(58) Field of Classification Search
USPC .......................................................... 349/12
See application file for complete search history.

(56) References Cited

U.S. PATENT DOCUMENTS

| | | | | |
|---|---|---|---|---|
| 2009/0278810 A1* | 11/2009 | Ma | ........................ | G06F 3/044 345/173 |
| 2010/0149116 A1* | 6/2010 | Yang et al. | .................... | 345/173 |
| 2010/0214262 A1* | 8/2010 | Ishizaki | .............. | G02F 1/13338 345/174 |
| 2011/0025969 A1* | 2/2011 | Chen | ................... | G02F 1/13338 349/139 |
| 2011/0115733 A1* | 5/2011 | Shih | ...................... | G06F 3/0412 345/173 |
| 2013/0162549 A1* | 6/2013 | Kim et al. | .................... | 345/173 |
| 2013/0285966 A1* | 10/2013 | Kimura | ................. | G06F 3/0412 345/173 |

OTHER PUBLICATIONS

English translation of first Office Action (listed above) issued by SIPO for International Application No. 201210299421. X, 9 pages.
English abstract of CN202711227U, listed above, 1 page.
English abstract of CN102436107A, listed above, 1 page.
English abstract of CN201477560U, listed above, 1 page.
Second Office Action (Chinese language) issued by the State Intellectual Property Office of People's Republic of China ("SIPO"), in Chinese application No. 201210299421.X, dated May 6, 2015, 6 pages.
English translation of Second Office Action issued by the State Intellectual Property Office of People's Republic of China ("SIPO"), in Chinese application No. 201210299421.X, dated May 6, 2015, 8 pages.

* cited by examiner

CAPACITIVE IN-CELL TOUCH PANEL AND DISPLAY DEVICE

CROSS REFERENCE TO RELATED APPLICATIONS

This application claims priority from Chinese National Application No. 201210299421.X filed on Aug. 21, 2012, the contents of which are incorporated herein by reference.

TECHNICAL FIELD

Embodiments of the invention relate to a capacitive in-cell touch panel and a display device.

BACKGROUND

With the rapid development of display technologies, touch screen panels have been widely-used in people's daily life. Currently, touch panels may be classified into an add on mode touch panel, an on cell touch panel and an in-cell touch panel, based on the structural configuration of the touch panels. Among the various touch panels, the add on mode touch panel employs a touch panel and a liquid crystal display (LCD) which are separately fabricated and then bonded together to form a LCD with a touch function. Such an add-on mode touch panel suffers from the disadvantages of high production cost, low transmitivity and thick module. In contrast. An in-cell touch panel embeds touch electrodes of the touch panel inside the LCD, which not only reduces the overall thickness of the module, but also significantly reduces the production cost of the touch panel. As a result, the in-cell touch panel is very popular with panel manufactures.

The currently available capacitive in-cell touch panel is implemented by directly adding a touch scan line and a touch sense line on a conventional Thin Film Transistor (TFT) array substrate. That is, two layers of strip-shape Indium Tin Oxides (ITO) electrodes intersecting each other in different planes are formed on a surface of the TFT array substrate. The two layers of ITO electrodes respectively function as the touch drive line and the touch sense line of the touch panel and an induction capacitor is generated at the non-coplanar intersection of the two ITO electrodes. The functioning procedure of the in-cell touch panel is as follows: when a touch drive signal is applied to the ITO electrode that functions as the touch drive line, a voltage signal coupled through the induction capacitor from the touch sense line is detected. During the procedure, when a human body contacts the touch panel, an electric field of the human body will affect the induction capacitor and thereby change the capacitance of the induction capacitor, which in turn changes the voltage signal coupled from the touch sense line. A position of the touch point is then determined from the change of the voltage signal.

The above in-cell touch panel structure requires two separate drive chips ICs to realize touch driving and display driving respectively and therefore has a high cost.

SUMMARY

Embodiments of the invention provide a capacitive in-cell touch panel and a display device so as to provide a capacitive in-cell touch panel with a relatively low cost.

An embodiment of the invention provides a capacitive in-cell touch panel, comprising: a color film substrate, a thin film transistor (TFT) array substrate, and a liquid crystal layer disposed between the color film substrate and the TFT array substrate, a plurality of pixel units arranged in a matrix are disposed on the TFT array substrate. The capacitive in-cell touch panel further comprises: at least one touch drive electrodes disposed on a side of the TFT array substrate facing the liquid crystal layer, and at least one touch sense electrode disposed on a side of the color film substrate facing the liquid crystal layer, wherein, wiring of the touch sense electrode runs along a column direction of the pixel units, wiring of the touch drive electrode runs along a row direction of the pixel units and the touch drive electrode is electrically connected to at least one gate line of the TFT array substrate.

Each touch drive electrode comprises a plurality of touch drive sub-electrodes arranged in the same row, the touch drive sub-electrodes are disposed between adjacent columns of pixel units.

Another embodiment of the invention provides a display device comprising the capacitive in-cell touch panel provided by the embodiment of the invention.

The capacitive in-cell touch panel and the display device provided by the embodiments of the invention have at least one touch sense electrode disposed on the color film substrate and at least one touch drive electrode disposed on the TFT array substrate. The touch drive electrode is electrically connected to the gate line in the TFT array substrate, wherein each touch drive electrode is made up of touch drive sub-electrodes disposed in the same row and between adjacent columns of pixel units. The capacitive in-cell touch panel and the display device provided by the embodiments of the invention employ the input display signal of the gate line electrically connected to the touch drive electrode as a drive signal of the touch to realize the touch control function, thereby avoiding the addition of the IC for touch drive and reducing the production cost.

BRIEF DESCRIPTION OF THE DRAWINGS

In order to clearly illustrate the technical solution of the embodiments of the invention, the drawings of the embodiments will be briefly described in the following. It is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The words "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In the following, detailed implementations of a capacitive in-cell touch panel and a display device in accordance with embodiments of the invention will be described in detail in connection with the drawings.

The thickness and the shape of each film layer in the drawings are just for illustrative purpose and do not represent the real proportion of the TFT array substrate and the color film substrate.

Figure 1:
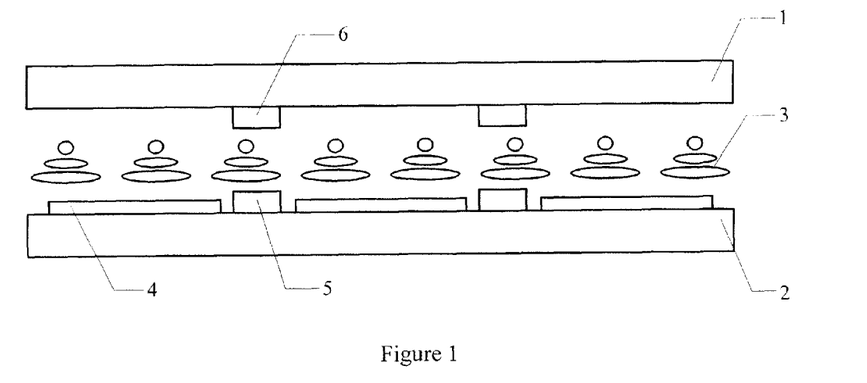
FIG. 1 schematically illustrates a configuration of a capacitive in-cell touch panel in accordance with an embodiment of the invention.

A capacitive in-cell touch panel provided by an embodiment of the invention is illustrated in FIG. 1. The capacitive in-cell touch panel comprises: a color film substrate 1, a TFT array substrate 2 and a liquid crystal layer 3 disposed between the color film substrate 1 and the TFT array substrate 2. A plurality of pixel units 4 arranged into a matrix is disposed on the TFT array substrate 2. The capacitive in-cell touch panel further comprises: at least one touch drive electrode 5 disposed on a side of the TFT array substrate 2 facing the liquid crystal layer 3, and at least one touch sense electrode 6 disposed on a side of the color film substrate 1 facing the liquid crystal layer 3, wherein wiring of the touch sense electrode 6 runs along a column direction of the pixel units 4.

Figure 2:
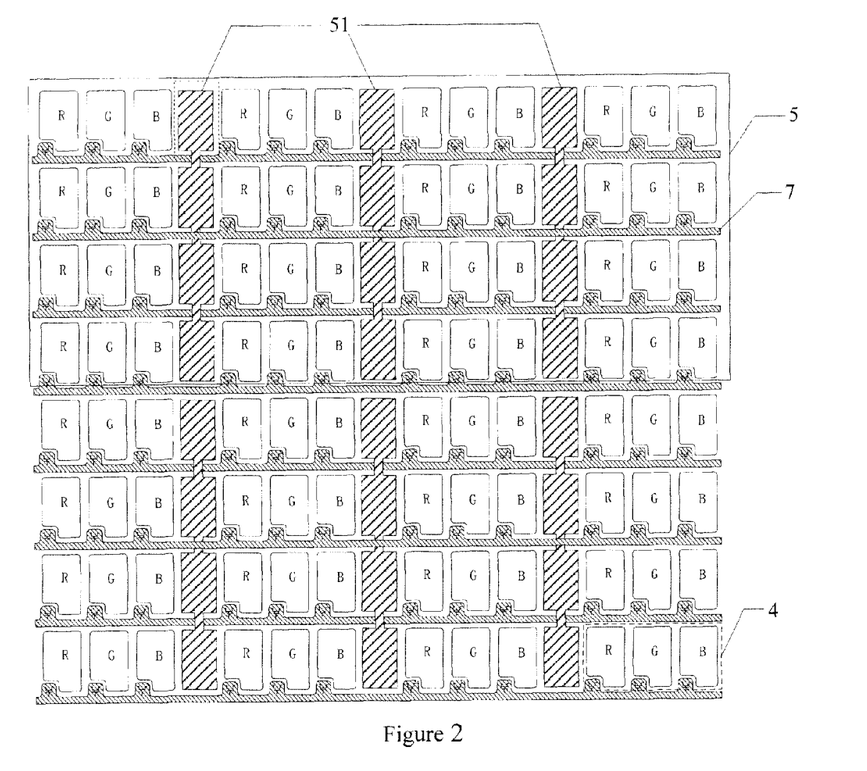
FIG. 2 schematically illustrates a configuration of a TFT array substrate of the touch panel in accordance with an embodiment of the invention.

FIG. 2 illustrates a top plan view of the TFT array substrate. It can be seen from FIG. 2 that a pixel element 4 comprises three sub-pixel units R, C, B, and wiring of the touch drive electrode 5 runs along a row direction of the pixel units 4 and the touch drive electrode 5 is electrically connected to at least one gate line 7 of the TFT array substrate 2.

Each touch drive electrode 5 comprises a plurality of touch drive sub-electrodes 51 arranged in the same row, and the touch drive sub-electrodes 51 are disposed between adjacent columns of pixel units 4.

The aforementioned capacitive in-cell touch panel as provided by the embodiment of the invention employs a display signal of the gate line electrically connected to the touch drive electrode as a touch drive signal to realize the touch control function, thereby avoiding the addition of an IC for touch drive, which accordingly saves the fabrication cost.

When implemented, for example, the touch drive sub-electrodes may be disposed in the same layer as a source electrode as well as a drain electrode of the TFT array substrate, that is, a pattern of the source electrode and the drain electrode of the TFT and a pattern of the touch drive sub-electrodes are fabricated in a single patterning process. Therefore, no additional patterning process will be introduced to the fabrication of the TFT array substrate and the fabrication cost of the TFT array substrate as the touch panel will not be increased.

Furthermore, when the electrical connection between the touch drive electrode and the gate line is established such that the display signal of the gate line may function as the touch drive signal, touch drive sub-electrodes in the same touch drive electrode may be electrically connected with each other by a drive data line disposed in the same layer as the touch drive electrode. The drive data line is disposed between adjacent rows of pixel units and electrically connected to the gate line. That is, the drive data line and each of the touch drive sub-electrodes connected thereto are fabricated at the same time. The drive data line may be disposed parallel to the gate line of the TFT array substrate, that is, disposed in a gap between adjacent rows of pixel unit. Then, the between the drive data line is electrically connected to the gate line using a via hole such that the gate line may provide signal to the drive data line.

Alternatively, when the touch drive electrode is electrically connected to the gate line such that the display signal of the gate line may function as the touch drive signal, as illustrated in FIG. 2, each touch drive sub-electrode 51 in the same touch drive electrode 5 may be electrically connected to the gate line 7 directly, such that a patterning process for fabricating the drive data line may be omitted. For example, the touch drive sub-electrode 51 is directly connected to an overlapped gate line 7 using a via hole; while a wire connection is used when the touch drive sub-electrode 51 does not overlap with the gate line 7.

Specifically, since the touch drive sub-electrodes in each touch drive electrode are disposed in the gap between pixel units, the touch drive sub-electrode will not have a width greater than the gap between adjacent columns of pixel units.

Generally speaking, the touch panel has a precision in the order of a millimeter, while the LCD has a precision of a micrometer. The precision of the touch panel is dependent on the length of the touch drive sub-electrodes, that is, the length of the touch drive sub-electrodes may be selected according to the required touch precision. Therefore, the length of each touch drive sub-electrode will span across the length of a number of pixel units in the column direction and normally is above 2 mm. Thus, each touch drive sub-electrode will overlap with a plurality of gate lines in the TFT array substrate providing the display signal for the TFT, and a parasitic capacitance will be generated at the overlapping part. The larger the overlapping part is, the larger the parasitic capacitor is. The parasitic capacitor may cause defections such as greenish picture and residual lines which will become more apparent with the increase of the panel size.

Therefore, when implemented, for the purpose of reducing the overlapping area between the touch sub-electrode and the gate electrode and then further reducing the parasitic capacitor, each touch drive sub-electrode 51 may be formed as a plurality of electrically connected drive dot electrodes adjacent each other in the column direction as illustrated in FIG. 2. In each row, the drive dot electrodes are disposed between adjacent pixel units and connected to each other via wires. In FIG. 2, an example of a touch drive sub-electrode 51 having four drive dot electrodes is illustrated, and the broken line marks such a dot drive electrode. As a result, the overlapping area between the wire and the gate line will be significantly less than the overlapping area between the drive dot electrode and the gate line, thereby minimizing the generation of the parasitic capacitor.

When implemented, for example, the touch sense electrode on the color film substrate may be disposed between a substrate and a color resin of the color film substrate, or on a side of the color resin of the color film substrate facing the liquid crystal layer.

Figure 3A:
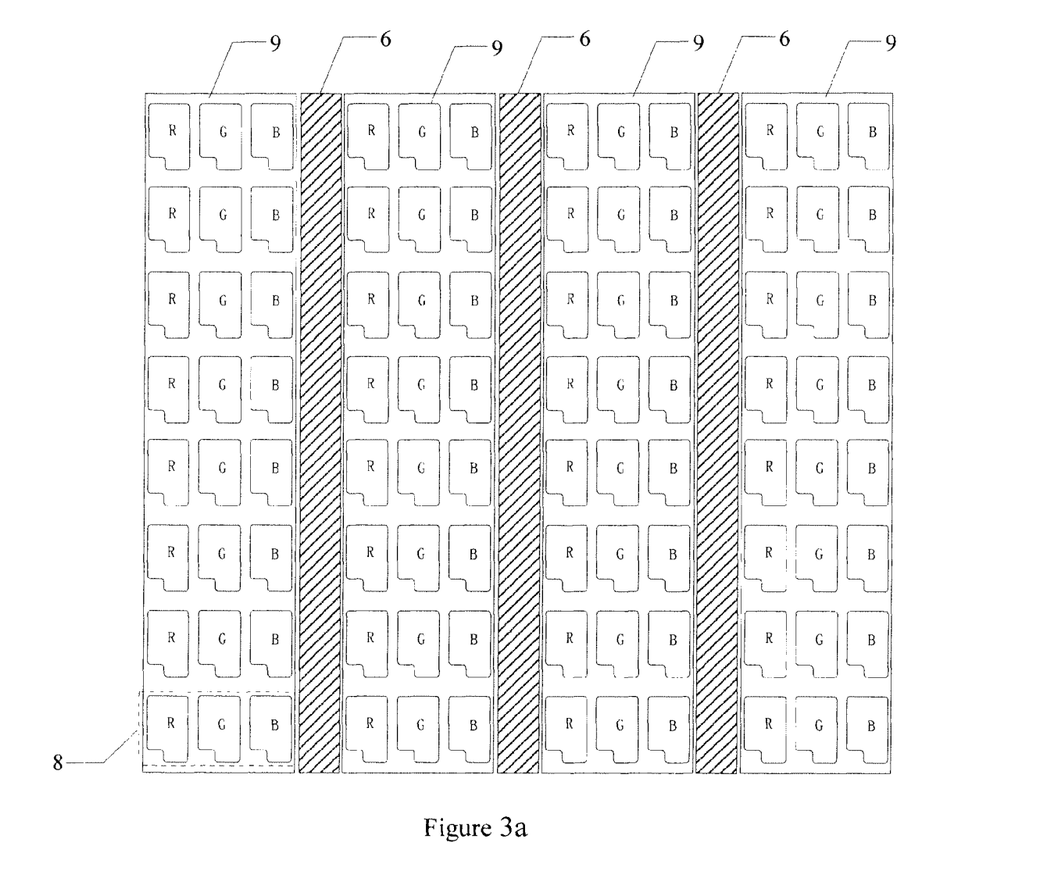
FIGS. 3a-3c schematically illustrate a configuration of a color film substrate of the touch panel in accordance with an embodiment of the invention.
Figure 3B:
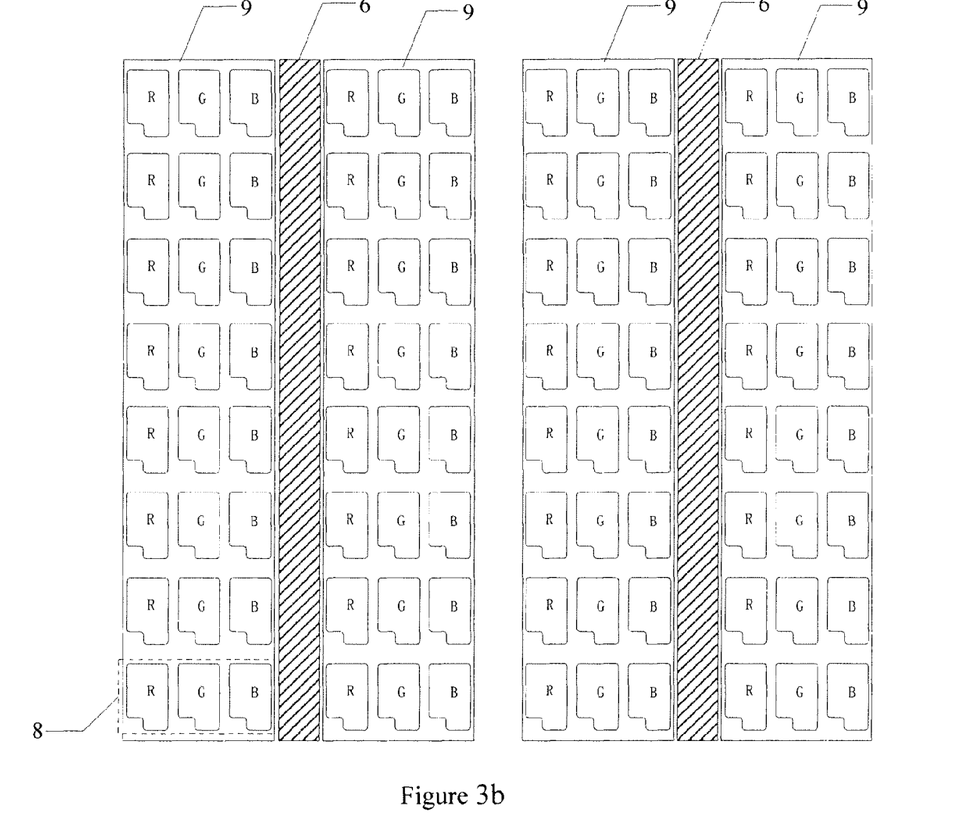
Figure 4A:
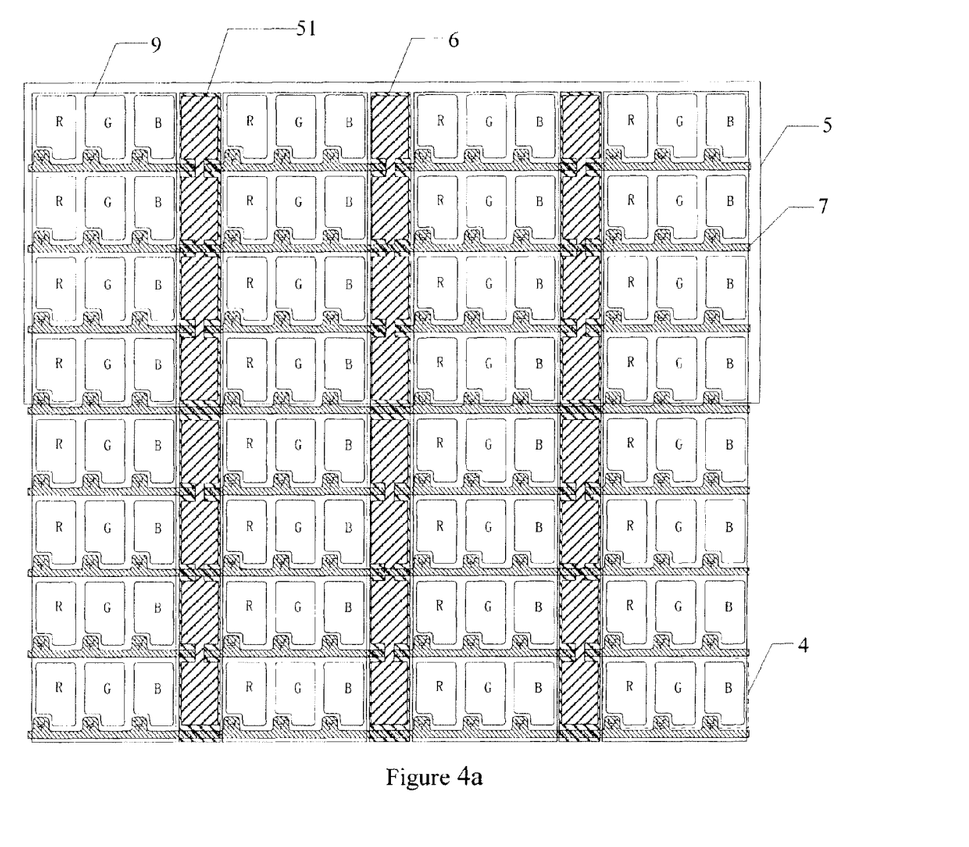
FIGS. 4a-4b schematically illustrate a configuration of a cell-assembled color film substrate and TFT array substrate of the touch panel in accordance with an embodiment of the invention.
Figure 4B:
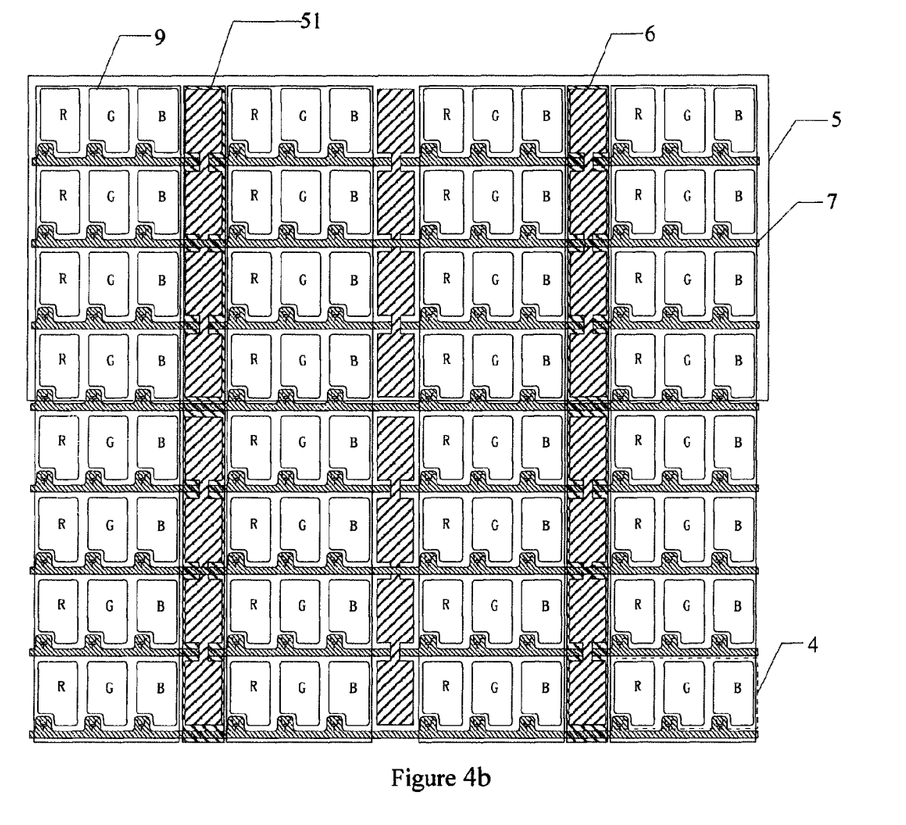

Generally, there exists a color film unit on the color film substrate, which has a one-to-one correspondence with the pixel units on the TFT array substrate, and the color film unit comprises three color film sub-elements R, G, B. Since the wiring of the touch sense electrode runs along the column direction of the pixel units, the projection of the touch sense electrode on the TFT array substrate may at least partially cover the touch drive electrode. Moreover, the plurality of touch drive sub-electrodes arranged in the same row included in each touch drive electrode is disposed between adjacent columns of pixel units. When implemented, for example, all touch sense electrodes 6 may be disposed between adjacent columns of color filter elements 8 on the color film substrate, as illustrated in FIG. 3a. The projection of the touch sense electrodes 6 on the TFT array substrate, in present the example, overlays all of the touch drive electrode as illustrated in FIG. 4a. The touch sense electrode 6 can be selectively disposed between some of the adjacent columns of color film elements 8. As an example, a touch sense electrode 6 is disposed at every other gap, the gaps are between adjacent columns of color filter elements 8 as illustrated in FIG. 3b. The projection of the touch sense electrode 6 on the TFT array substrate is illustrated in FIG. 4b, which partially covers the touch drive electrode and will not be described in detail here.

Furthermore, shield electrodes fabricated on a side of the color film substrate opposite to the liquid crystal layer in conventional technologies may be fabricated on the side of the color film substrate facing the liquid crystal layer, which may facilitate the thinning process after cell assembling the color film substrate and the TFT array substrate. As an example, a particular liquid is used to etch the exposed substrate. More specifically, a plurality of shield electrodes may be disposed between the substrate and the color resin of the color film substrate or on the side of the color resin of the color film substrate facing the liquid crystal layer. When implemented, for example, a common electrode electrically connected to the shield electrodes may be used to supply a common electrode signal to the shield electrodes so as to shield interference from external signals. Preferably, fabricating the shield electrodes between the substrate and the color resin of the color film substrate can help shielding the interference from the external signals in a better way.

Furthermore, the shield electrodes fabricated as a whole layer in conventional technologies is fabricated as a strip, and wirings of the shield electrodes and touch sense electrode run in the same direction, thus projections of them on the color film substrate do not overlap with each other. For example, the projection of a shield electrode on the TFT array substrate covers all of a column of pixel units. As illustrated in FIGS. 3a and 3b, a shield electrode 9 on the color film substrate covers a column of color filter element 8 comprising R, G and B. Thus, when the projection of each touch sense electrode on the TFT array substrate fully or partially overlays the space between adjacent pixel units as illustrated in FIGS. 3a and 3b, the shield electrode 9 and the touch sense electrode 6 may be disposed in the same layer as there is no overlap between the patterns of the shield electrode 9 and the touch sense electrode 6. The shield electrodes and the touch sense electrodes may be disposed in different layers of the color film substrate, which will not be limited here.

Figure 5A:
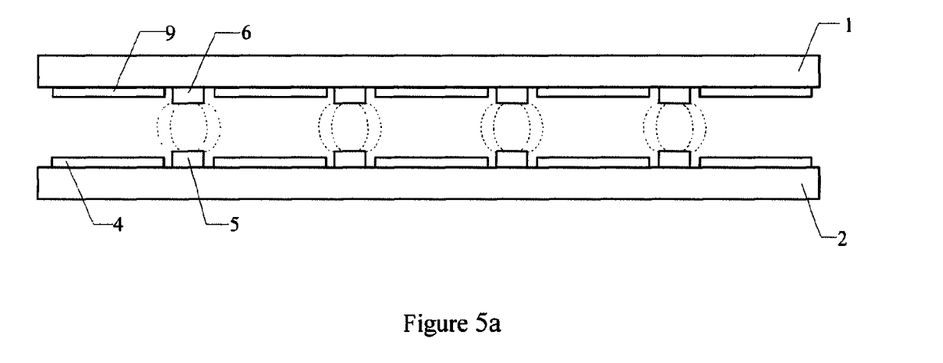
FIGS. 5a-5c schematically illustrate a projected electric field of the touch panel in accordance with an embodiment of the invention.
Figure 5B:
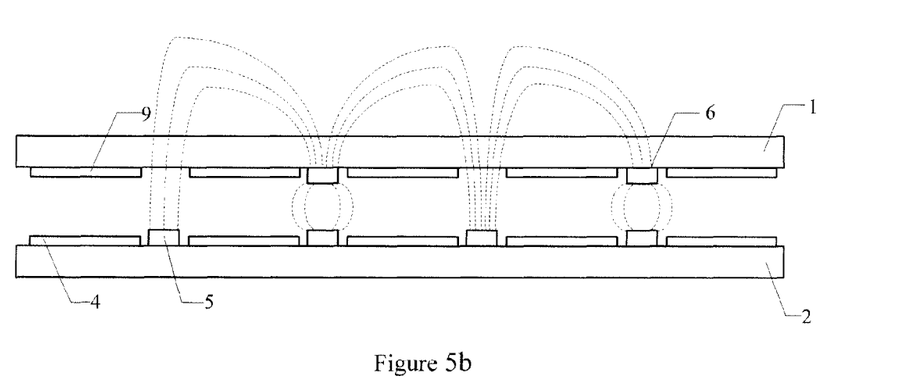

Specifically, when the projection of each touch sense electrode 6 on the TFT array substrate overlays all space between adjacent columns of pixel units 4, a top plan view after cell assembling the color film substrate and the TFT array substrate is illustrated in FIG. 4a. It is seen from FIG. 4a that the touch sense line 6 substantially overlays the touch drive sub-electrode 51, which is not advantageous for the the electric field from the touch drive electrode projected through the gap between the shield electrodes 9 as illustrated in FIG. 5a. When the projection of each touch sense electrode 6 on the TFT array substrate overlays a part of the space between the adjacent columns of pixel units 4, a top view after cell assembling the color film substrate and the TFT array substrate is illustrated in FIG. 4b. It is seen from FIG. 4b that the touch sense line 6 partially overlays the touch drive sub-electrode 51, that is, a part of the touch drive sub-electrodes 51 is not blocked by the touch sense electrodes 6. Therefore, the electric field from the touch drive electrode 5 can be partially projected to the touch sense electrode 6 through the gap between the shield electrodes 9 as illustrated in FIG. 5b.

Figure 3C:
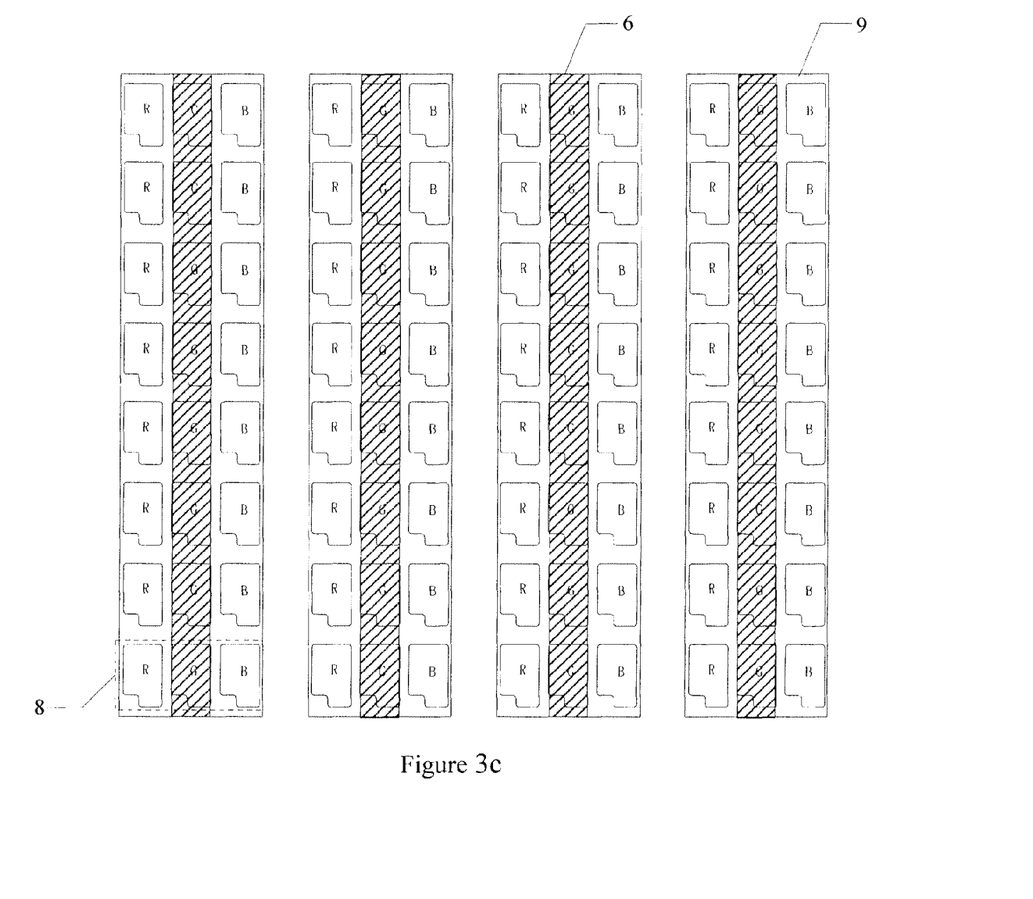
Figure 5C:
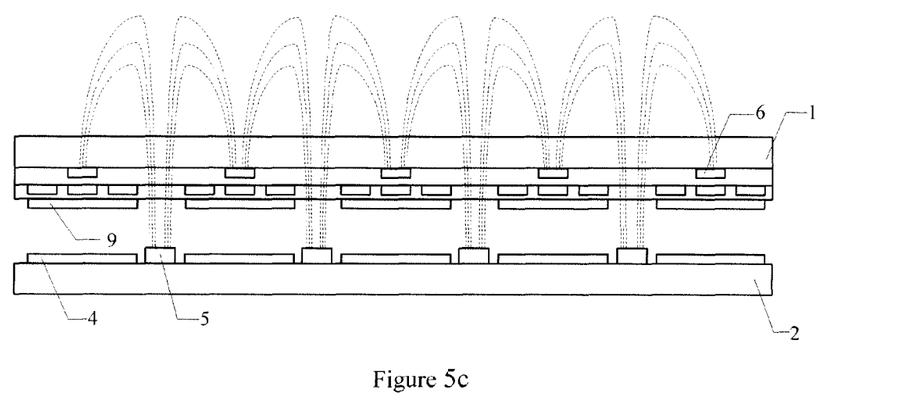

Furthermore, other than being disposed as having projections on the TFT array substrate that at least partially overlay the touch drive electrode, each touch sense electrode can also be disposed such that the projection on the TFT array substrate does not overlay the touch drive electrode. In an example, as illustrated in FIG. 3c, the touch sense electrode 6 overlays a column of color filter sub-elements of the color filter elements. In such a case, the touch sense electrodes 6 are generally disposed between the substrate and the color resin of the color film substrate. In this case, the color film substrate may further comprises: a plurality of shield electrodes 9 disposed on the side of the color resin of the color film substrate facing the liquid crystal layer, the projection of each shield electrode on the color film substrate at least overlays a touch sense electrode. As an example, the projection of a shield electrode on the TFT array substrate completely overlays a column of pixel units as illustrated in FIG. 5c. In this case, the shield electrodes are generally disposed on the side of the color resin of the color film substrate facing the liquid crystal layer.

Specifically, for example, a design having the projection of each touch sense electrode on the TFT array substrate overlaying a column of sub-pixel units of a column of pixel units as illustrated in FIG. 5c may further reduce the blockage on the projected electric field. That is, the touch sense electrode 6 is disposed on a column of color filter sub-elements. The electric field from the touch drive electrode 5 may be projected onto the touch sense electrodes 6 through the gap between the shield electrodes 9, without being blocked.

Furthermore, the color film substrate having the above structure has two layers of electrodes, that is, the shield electrodes 9 and the touch sense electrodes 6. In order to reduce the signal delay between the two electrode layers, thickness of the two electrodes layers are normally above 1000 Å. Moreover, in order to reduce the parasitic capacitor between the shield electrodes 9 and the touch sense electrode 6, a width of the touch sense electrode is designed as being narrow as possible, e.g. about 20 μm. When implemented, for example, a specific width value for the touch sense electrode may be determined according to the size, the aperture ratio and the required touch precision of the LCD, which will not be elaborated here.

Figure 6:
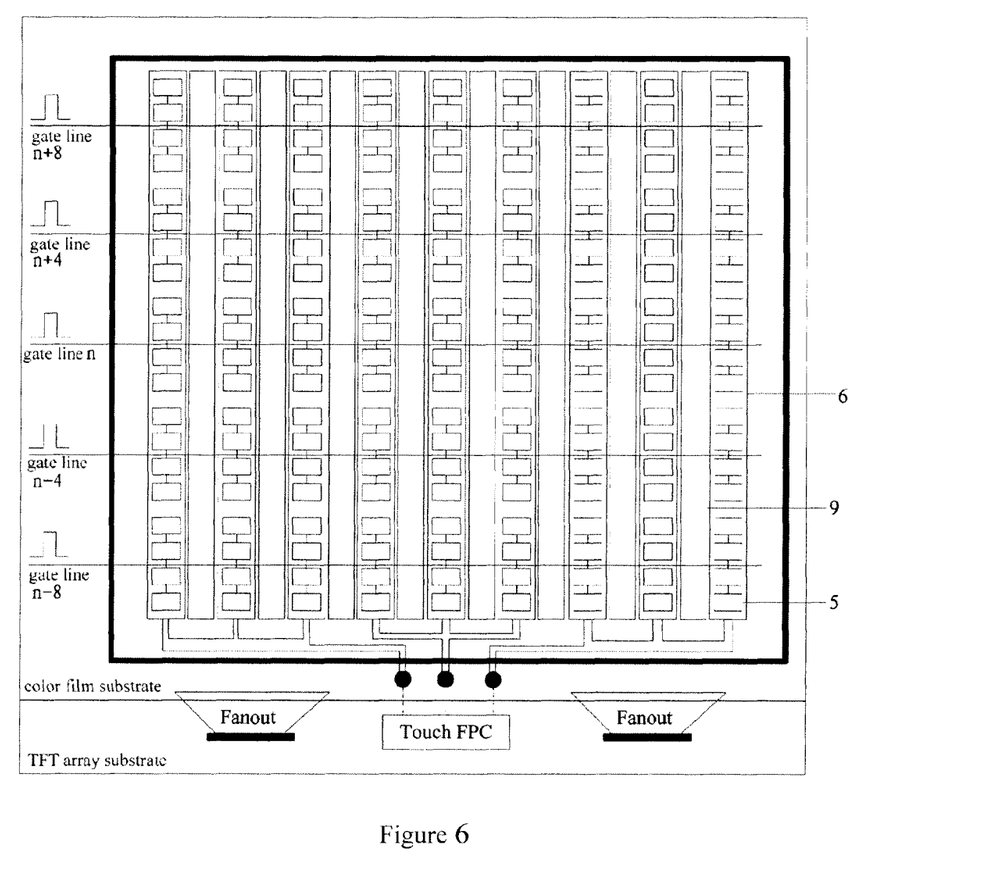
FIG. 6 schematically illustrates a connection relation of the touch sense line in accordance with an embodiment of the invention.

Similarly, since the precision of the touch panel is normally in the order of a millimeter while the precision of the LCD is normally in the order of a micrometer, a number of adjacent touch sense electrodes may be used as one touch sense electrode. When implemented, for example, several adjacent touch sense lines may be connected conductively using a wire at one end, based on the required touch precision, and work as a single touch sense electrode. As illustrated in FIG. 6, an example of having three touch sense electrodes 6 conductively connected at one end is shown, after three touch sense electrodes 6 are conductively connected as one touch sense electrode, seal glue is used to connect the touch sense electrode with a touch flex print circuit (FPC) in the region outside the fanout region of the color film substrate, thereby reducing the wiring in the fanout region.

According to the same inventive concept, an embodiment of the invention further provides a display device comprising the afore-mentioned capacitive in-cell touch panel provided by the embodiment of the invention. For the implementation of the display device please refer to the embodiments of the above capacitive in-cell touch panel, which will not be described in detail here.

The capacitive in-cell touch panel and the display device provided by the embodiments of the invention have at least one touch sense electrode disposed on the color film substrate and at least one touch drive electrode disposed on the TFT array substrate, the touch drive electrode is electrically connected to the gate line in the TFT array substrate, wherein each touch drive electrode comprises touch drive sub-electrodes disposed in the same row and between adjacent column of pixel units. The capacitive in-cell touch panel and the display device provided by the embodiments of the invention employ the input display signal of the gate line connected to the touch drive electrode as the touch drive signal to realized the touch control function, thereby avoiding the addition of the IC for touch drive and reducing the production cost.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A capacitive in-cell touch panel, comprising: a color film substrate, a thin film transistor (TFT) array substrate and a liquid crystal layer disposed between the color film substrate and the TFT array substrate, wherein a plurality of pixel units arranged into a matrix is disposed on the TFT array substrate, at least one touch drive electrode is disposed on a side of the TFT array substrate facing the liquid crystal layer, and at least one touch sense electrode is disposed on a side of the color film substrate facing the liquid crystal layer, the touch sense electrode is wired along a column direction of the pixel units, the touch drive electrode is wired along a row direction of the pixel units and is electrically connected to at least one gate line of the TFT array substrate;

each of the at least one touch drive electrodes comprises a plurality of touch drive sub-electrodes arranged in the same row, the touch drive sub-electrodes are disposed between adjacent columns of pixel units.

2. The touch panel claim 1, wherein the touch drive sub-electrodes and source electrodes as well as drain electrodes of the pixel units of the TFT array substrate are disposed in the same layer.

3. The touch panel of claim 2, wherein the touch drive sub-electrodes in a single touch drive electrode are electrically connected with each other through a drive data line disposed in the same layer, the drive data line is disposed between adjacent rows of pixel units and electrically connected to the gate line.

4. The touch panel of claim 2, wherein each of the touch drive sub-electrodes in a single touch drive electrode is respectively electrically connected to the gate line.

5. The touch panel of claim 1, wherein each touch drive sub-electrode comprises a plurality of electrically connected drive dot electrodes adjacent each other in the column direction; in each row, the dot drive electrodes are disposed between adjacent pixel units.

6. The touch panel of claim 1, wherein the touch sense electrodes is disposed between a substrate and a color resin of the color film substrate, or disposed on a side of the color resin of the color film substrate facing the liquid crystal layer.

7. The touch panel of claim 1, wherein a projection of each touch sense electrode on the TFT array substrate overlays at least a part of the touch drive electrode.

8. The touch panel of claim 7, wherein the color film substrate further comprises a plurality of shield electrodes disposed between the substrate and the color resin of the color film substrate, or on a side of the color resin of the color film substrate facing the liquid crystal layer; the shield electrodes and the touch sense electrodes are wired in the same direction, and projections of both the shield electrodes and the touch sense electrode on the color film substrate do not overlap with each other.

9. The touch panel of claim 8, wherein the shield electrodes and the touch sense electrode is disposed in the same layer.

10. The touch panel of claim 1, wherein a projection of each touch sense electrode on the TFT array substrate does not overlap with the touch drive electrode.

11. The touch panel of claim 1, wherein the color film substrate further comprises a plurality of shield electrodes disposed on a side of the color resin of the color film substrate facing the liquid crystal layer, a projection of each of the shield electrodes on the color film substrate overlays at least one of the touch sense electrodes.

12. The touch panel of claim 11, wherein the touch sense electrode is disposed between the substrate and the color resin of the color film substrate, and the shield electrodes are disposed on a side of the color resin of the color film substrate facing the liquid crystal layer.

13. The touch panel of claim 1, wherein a plurality of touch sense electrodes are conductively connected with each other via a wire at either end.

14. A display device comprising the capacitive in-cell touch panel of claim 1.

* * * * *

UNITED STATES PATENT AND TRADEMARK OFFICE
CERTIFICATE OF CORRECTION

PATENT NO. : 9,606,390 B2  
APPLICATION NO. : 13/968030  
DATED : March 28, 2017  
INVENTOR(S) : Haisheng Wang et al.

Page 1 of 1

It is certified that error appears in the above-identified patent and that said Letters Patent is hereby corrected as shown below:

On the Title Page  
Please replace the Assignee item (73): "Beijing COE Optoelectronics Technology Co., Ltd., Beijing (CN)" with --Beijing BOE Optoelectronics Technology Co., Ltd., Beijing (CN)--

Signed and Sealed this  
Ninth Day of May, 2017

Michelle K. Lee  
*Director of the United States Patent and Trademark Office*